June 5, 1934. F. W. SPERR, JR 1,961,255
GAS PURIFICATION
Filed July 19, 1930
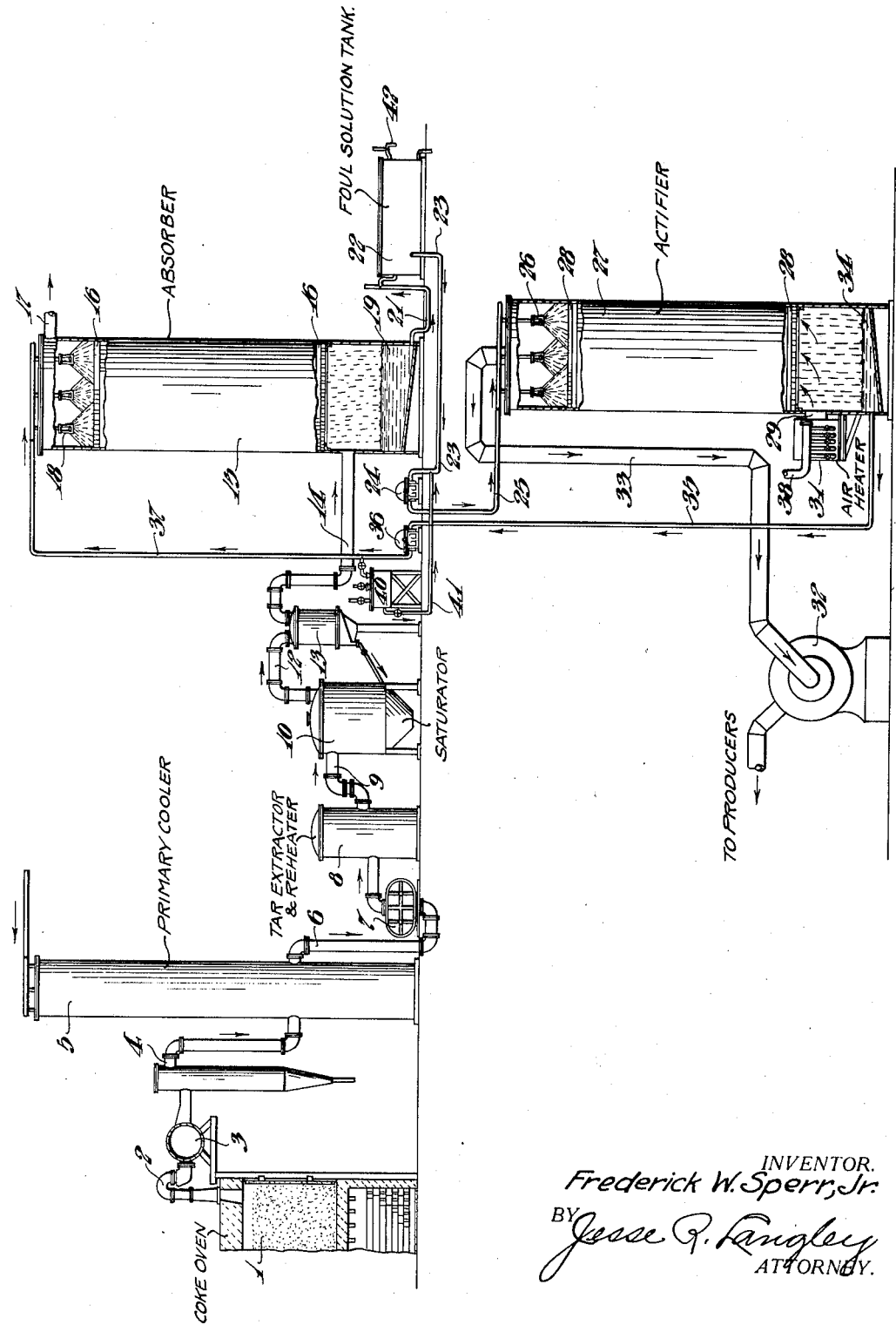
INVENTOR.
Frederick W. Sperr, Jr.
BY Jesse R. Langley
ATTORNEY.

Patented June 5, 1934

1,961,255

UNITED STATES PATENT OFFICE 1,961,255

GAS PURIFICATION

Frederick W. Sperr, Jr., Pittsburgh, Pa., assignor to The Koppers Company of Delaware, a corporation of Delaware Application July 19, 1930, Serial No. 469,238

9 Claims. (Cl. 23—3)

My invention relates to the purification of fuel gases, more particularly to the removal therefrom of hydrogen sulphide, hydrogen cyanide and analogous acidic impurities, and it has an especial relation to the treatment of coal gas, for example, gas produced by the carbonization of coal in by-product coke ovens. More particularly, the present invention is an improvement in the process of my copending application Serial No. 60,870, filed October 6, 1925, now Patent No. 1,878,609, of which this application is a continuation in part.

In U. S. Patents No. 1,389,980 to Charles J. Ramsburg, and No. 1,390,037 to David L. Jacobson, there is described and claimed a process for the purification of gases from impurities of the character recited above by means of employment of an alkaline solution, such, for example, as an aqueous solution of sodium carbonate. As set forth in these patents, the process is continuous, the alkaline solution being continuously recirculated through a cycle comprising an absorption stage where it is brought into contact of the flowing gas for the removal of impurities therefrom, and an actification stage where the liquid is recirculated by treatment with a suitable gas, such as air.

The advantages of this co-called "liquid purification" process are numerous and there have been many installations thereof in this country and abroad. In such installations, however, it has been the practice to locate the absorption stage of the process at a point where the gas is at substantially atmospheric temperature, for example, at a point subsequent to the conventional final cooler of a coke-oven gas manufacturing plant. In these installations the gas was thus cooled in the usual manner prior to treatment in the liquid purification plant, which necessitated the employment of both a final cooler and an absorber even where mere cooling to such atmospheric temperatures as prevail in moderate or warm weather was desired.

An object of the present invention is to provide a gas purification process in which a simultaneous cooling and purification of the gas may be effected and the use of a supplementary final cooler rendered unnecessary.

My invention has for further objects such other operative improvements and advantages as may hereinafter be found to obtain.

As is well known, coal gas and more particularly coke oven gas is subjected, during the course of manufacture and preparation for distribution, to a fairly definite sequence of purification operations.

The gas coming from the carbonizing chamber is first washed with water or ammoniacal liquor in the so-called "hydraulic main" to remove a portion of the tar and ammonia therefrom, and is then cooled by means of water or recirculated liquor in apparatus known as the primary cooler, principally for the purpose of rendering possible the more complete removal of tar. The cooled gas is then treated for the removal of tar and is then reheated to facilitate the subsequent removal of ammonia therefrom. The reheated gas is led through a bath of sulphuric acid which reacts with the ammonia present in the gas to form ammonium sulphate.

The gas thus leaves the saturator, wherein the removal of ammonia takes place, in a more or less heated condition, for example, at a temperature of about 40° C. or even higher, and at this point contains considerable amounts of moisture, acidic impurities, such as hydrogen sulphide and hydrogen cyanide, hydrocarbons such as naphthalene, and the like. It has been the practice in the past to pass the gas directly from the ammonia removal operation to the final cooler where the gas is washed with water at substantially atmospheric temperature.

The temperature of the gas is thus reduced to substantially atmospheric and considerable amounts of moisture and naphthalene are thereby removed. As stated hereinabove, the purification of the gas from acidic impurities has heretofore been accomplished subsequent to this final cooling operation.

According to the present invention the absorption stage of the liquid purification process is located in the path of the gas at a point, for example, immediately subsequent to the ammonia removal operation, where the gas has a temperature materially above atmospheric. The liquid purification process is so conducted that the gas is not only purified of the bulk of its contained acidic impurities, but is also materially cooled, for example, to substantially atmospheric temperatures, so that in most cases no further cooling of the gas is required and the final cooler may be eliminated.

In order to effect a cooling of the gas in the absorption stage when located according to my invention and in addition to the purification, the temperature and volume of the recirculating liquid are maintained in such proportion and amount as to effect a material cooling of the gas. Moreover, a sufficient content of actified absorbent material, for example, sodium carbonate, is maintained in the liquid to effect a removal from the gas of the bulk of the hydrogen sulphide contained in the latter.

This is done by employing actifier air in the actification stage in such temperature and amount as to remove from the recirculated solution an amount of hydrogen sulphide corresponding to the bulk of the hydrogen sulphide contained in the gas, and an amount of moisture equal to that necessary to be given up by the gas in the cooling which is effected in the absorption stage, and to dissipate an amount of heat substantially equal to that given up by the gas in cooling to the desired point.

In the usual case, where the gas to be purified contains a normal amount of acidic impurities, the amount of actifier air employed will be of the ratio of at least two volumes of air per volume of gas purified. In warm weather it frequently happens that no substantial heating of the actifier air prior to its introduction to the actifier is necessary, but under less temperate conditions it frequently becomes advisable or necessary to accomplish a preheating of the actifier air in order that the results hereinabove recited may be effected.

I have also found that in order to prevent the deposition of undesirable materials such as naphthalene in the liquid purification operation, it is desirable to maintain a definite temperature relation between the primary cooler and the absorber. More specifically, the temperature to which the gas is cooled in the absorber may be maintained at a point slightly in excess of the lowest temperature attained by the gas at any point previous to its entry into the said absorber. In general, this means that the temperature of the gas leaving the primary cooler is maintained at a point slightly below the temperature of the gas leaving the absorber.

In order that my invention may be fully set forth and understood, I now describe with reference to the accompanying drawing a preferred manner in which it may be practiced and embodied, together with examples of specific operations. In this drawing, The single figure is a more or less diagrammatic elevational view of apparatus for accomplishing the purification of coke-oven gas according to the process of the present invention.

Referring to the drawing, coal gas is produced by the carbonization of coal or other carbonaceous material within a coke oven 1 or the like. The resultant distillation gases are withdrawn from the individual chambers of the coke-oven apparatus through standpipes 2 into a so-called hydraulic collecting main 3 where they are given a preliminary scrubbing with ammonia liquor for the removal of a portion of the ammonia and tar therefrom. The gas then passes in a conventional manner through a conduit 4 into a primary cooler 5 which may be either of the direct or indirect type, but in which in either case the gas is cooled to a temperature of from about 15° to 30° C. Further amounts of tar, moisture and ammonia are removed at this point.

The gas is then drawn through a conduit 6 by means of an exhauster 7, is treated for the removal of the remaining tar, and then reheated in preparation for the subsequent ammonia removal operation. In the present instance this final tar extraction and reheating both take place in a combined tar extractor and reheater 8, although separate apparatus units are frequently employed for this purpose.

The gas then passes through a conduit 9 to a saturator 10 which may be of conventional type and is adapted to contain a bath of sulphuric acid. The acid reacts with the ammonia remaining in the gas to form ammonium sulphate which is left behind in the saturator 10 and can be removed therefrom. The gas emerging from the saturator 10 is next passed through a conduit 12 into an acid separator 13 for the removal of entrained sulphuric acid, and then passes through a conduit 14 into a tower 15 constituting the absorption stage of the liquid purification process.

The tower 15 which serves to perform the functions of a combined absorber and final cooler may be of any suitable type, the one illustrated being a conventional gas-and-liquid contact tower having a packing consisting of hurdles 16 or other suitable material. The gas enters the bottom of the tower 15 through the conduit 14 and passes upward through the hurdles 16 to emerge from the top of the tower 15 in a purified and cooled state through a conduit 17.

The purification and cooling of the gas is effected during the time the gas traverses the tower 15 by means of an alkaline solution, for example, a solution of from 1 to 3% sodium carbonate, introduced to the top of the tower 15 through suitable sprays 18. The solution thus introduced passes downward through the tower in countercurrent with the rising gas and effects a removal of the bulk of the hydrogen sulphide and hydrogen cyanide contained in the gas, as well as a cooling of the gas and a removal of moisture therefrom.

During its downward course of the tower 15 the solution therefore becomes fouled with impurities removed from the gas and in this state is collected in a sump 19 conveniently located at the bottom of the tower 15 and from which it passes through a conduit 21 into a foul solution tank 22.

The foul solution is continuously withdrawn from the tank 22 through a conduit 23 and is delivered by means of a pump 24, a conduit 25 and sprays 26 into the upper part of an actifier 27, which may be similar in construction to the tower 15 and which preferably contains a packing of wooden hurdles 28 or other suitable material.

The foul solution passes downward through the interior of the actifier 27 preferably in countercurrent to a rising flow of air or other gas which, at the point of introduction, at least, contains substantially no hydrogen sulphide or at least a quantity of hydrogen sulphide less than that contained by the gas being purified in the absorber 15. In the present instance air is employed, being introduced through the bottom of the actifier 27 through an inlet 29 communicating with a preliminary air heater 31.

The air is drawn upward through the actifier 27 by means of a fan 32 communicating with the actifier 27 by means of a fan 32 communicating with the actifier 27 by means of a conduit 33. Where desired, the actifier air which contains hydrogen sulphide may be delivered by the fan 32 to gas producers, retorts, settings or boilers for combustion of the air. In other cases it may simply be delivered to the atmosphere.

In the actifier 27 the foul solution introduced through the sprays 26 is regenerated by a reversal of the absorption reactions taking place in the absorber 15, and the solution is thus regenerated for further use. The actified solution reaching the bottom of the actifier 27 and collecting, for example, in a sump 34 conveniently located in the bottom of the actifier 27, is drawn through a conduit 35 by means of a pump 36 and delivered through a conduit 37 and sprays 18 into the tower 15 as before, thus completing the cycle.

The air heater 31 may be provided with steam or other heating fluid through a conduit 38 so arranged as to be able to accomplish whatever heating of the actifier air is desired.

As hereinabove stated, the amount and temperature of the actifier air is maintained in such proportion and amount as to remove from the recirculated solution an amount of hydrogen sulphide corresponding to the bulk of that impurity contained in the gas being treated, also the air operates to remove a quantity of moisture corresponding to that lost by the gas in its cooling in the tower 15 and to dissipate an amount of heat corresponding to that necessary to be given up by the gas in the cooling which is effected.

At this point it may be noted that the amount of hydrogen sulphide given up to the actifier air in the absorber 27 does not exactly equal the amount of hydrogen sulphide absorbed from the gas in the absorber 15. The explanation for this is as follows:

When, as in the usual case, the liquid employed for purification is prepared by simply dissolving sodium carbonate in water, the reaction which takes place is primarily as follows:

$$Na_2CO_3 + H_2S \rightarrow NaHCO_3 + NaHS.$$

In the actifier this reaction is reversed due to the establishment of an equilibrium between the foul solution and the at least relatively pure air or other gas employed for actification so that the reaction then proceeds as follows:

$$NaHCO_3 + NaHS \rightarrow Na_2CO_3 + H_2S.$$

It would therefore appear that except for mechanical losses the sodium carbonate is continuously regenerated and no replacements thereof except for such mechanical losses would be required.

However, in this and similar processes, certain side reactions take place. One of these results in the formation of sodium thiosulphate. The sodium thiosulphate thus produced is stable under the conditions of the process, can effect no further removal of hydrogen sulphide, and represents a definite loss of alkali.

Moreover, the hydrogen cyanide also present in the gas is absorbed by the alkaline solution resulting principally in the formation of sodium thiocyanate. This represents an additional loss of alkali.

Thus the hydrogen sulphide driven off in the actifier 27 corresponds in fact to the difference between the amount of hydrogen sulphide removed from the gas and the amount of hydrogen sulphide absorbed in the side reactions mentioned. The sodium thiosulphate and sodium thiocyanate which result from the occurrence of these side reactions gradually accumulate in the solution. Not only must sufficient alkali be added from time to time to replace losses of active alkali material due to the formation of these side products, but, over extended periods at least, portions of the solution are preferably withdrawn from time to time and replaced with substantially equal amounts of fresh solution in order to prevent the building up of these materials to an excessively high point where they would interfere with the process.

Such additions of fresh solution are conveniently made by dissolving sodium carbonate or other suitable alkali in water in a tank 40 from which the fresh solution thereby obtained may be drawn through a conduit 41 by a pump 24. A corresponding amount of the recirculated solution may be withdrawn by means of an overflow pipe 42 leading from the foul solution tank 22.

The following examples of actual performance of the process of my invention will be of material interest and have been selected with the view of showing the performance of the process under varying temperature conditions.

In these illustrative examples, the first, herein designated as Example "A", represents actual operating figures at a time of the year when relatively warm temperature conditions prevailed, that is, in mid-summer. Example "B" is typical of operation under moderate temperatures, as in spring, and Example "C" is typical of relatively low temperature conditions, as in mid-winter.

*Example A*

| | |
|---|---|
| Gas purified | 627,000 cu. ft. per hour. |
| Temperature of gas entering primary cooler | 75° C. |
| Temperature of gas leaving primary cooler | 29° C. |
| Temperature of gas leaving saturator | 48° C. |
| Temperature of gas leaving absorber | 31° C. |
| H₂S content of gas entering absorber | 280 grs. per 100 cu. ft. of gas. |
| H₂S content of gas leaving absorber | 20 grs. per 100 cu. ft. of gas. |
| Total alkalinity of solution (as Na₂CO₃) | 3.43%. |
| Soda consumption | 0.063 lbs. per 1000 cu. ft. of gas. |
| Solution recirculation rate | 36,000 to 40,000 gals. per hr. |
| Ratio of actifier air to gas | 2:1. |
| H₂S removed | 260 grs. per 100 cu. ft. of gas. |
| Extent of purification from H₂S effected | 92.8%. |

*Example B*

| | |
|---|---|
| Gas purified | 652,000 cu. ft. per hr. |
| Temperature of gas entering primary cooler | 73° C. |
| Temperature of gas leaving primary cooler | 18° C. |
| Temperature of gas leaving saturator | 56° C. |
| Temperature of gas leaving absorber | 21° C. |
| H₂S content of gas entering absorber | 270 grs. per 100 cu. ft. of gas. |
| H₂S content of gas leaving absorber | 20 grs. per 100 cu. ft. of gas. |
| Total alkalinity of solution (as Na₂CO₃) | 2.02%. |
| Soda consumption | 0.075 lbs. per 1000 cu. ft. of gas. |
| Solution recirculation rate | 43,000 to 45,000 gals. per hr. |
| Ratio of actifier air to gas | 2:1. |
| H₂S removed | 250 grs. per 100 cu. ft. of gas. |
| Extent of purification from H₂S effected | 92.5%. |

Example C

| | |
|---|---|
| Gas purified | 722,000 cu. ft. per hr. |
| Temperature of gas entering primary cooler | 75° C. |
| Temperature of gas leaving primary cooler | 27° C. |
| Temperature of gas leaving saturator | 52° C. |
| Temperature of gas leaving absorber | 29° C. |
| H₂S content of gas entering absorber | 250 grs. per 100 cu. ft. of gas. |
| H₂S content of gas leaving absorber | 50 grs. per 100 cu. ft. of gas. |
| Total alkalinity of solution (as Na₂CO₃) | 1.25%. |
| Soda consumption | 0.069 lbs. per 1000 cu. ft. of gas. |
| Solution recirculation rate | 43,000 to 45,000 gals. per hr. |
| Ratio of actifier air to gas | 2:1. |
| H₂S removed | 200 grs. per 100 cu. ft. of gas. |
| Extent of purification from H₂S effected | 80%. |

It will be noted that in each of the above instances the temperature of the gas leaving the absorber is maintained slightly in excess of the temperature of the gas leaving the primary cooler in order, as above stated, that the deposition of naphthalene in the absorber may be prevented.

Under ordinary conditions, no "final" or supplemental cooler will be required and a simplification of apparatus is thereby effected. Moreover, the troublesome final cooler effluent which always contains more or less acidic impurities is no longer required to be dealt with.

The actifier air is delivered to the gas producers saturated with moisture at a much higher temperature than is ordinarily possible. Furthermore, the treatment of the gas with an alkaline liquid immediately after leaving the ammonia saturator effects a highly desirable neutralization of any sulphuric acid or ammonium sulphate entrained in the gas and a troublesome source of corrosion is thereby eliminated.

It will be obvious to those skilled in the art that my invention is capable of considerable modification with respect to the several details thereof and is not limited to the specific examples given hereinabove by way of illustration but may variously be practiced and embodied within the scope of the claims hereinafter made.

I claim as my invention:

1. The process of treating fuel gas containing hydrogen sulphide which comprises removing tar therefrom, then passing the gas through an acid bath to remove ammonia from the gas, and thereafter recirculating an aqueous solution of an alkaline absorbent agent through a cycle comprising an absorption stage in which it is brought into contact with the flowing gas while still hot from the acid bath and an actification stage, maintaining the temperature and volume of the recirculating solution in such relation and amount with respect to the temperature and amount, respectively, of the gas treated, as to effect a cooling of the gas from a high temperature ranging from substantially 56° C. to 48° C. down to a low temperature ranging from 21° to 31° C., and maintaining a sufficient content of actified absorbent agent in the solution to effect a removal from the gas of the bulk of its contained hydrogen sulphide.

2. The process of treating fuel gas containing hydrogen sulphide which comprises removing tar therefrom, then passing the gas through an acid bath to remove ammonia from the gas, and thereafter recirculating an aqueous solution of sodium carbonate through a cycle comprising an absorption stage in which it is brought into contact with the flowing gas while still hot from the acid bath and an actification stage, maintaining the temperature and volume of the recirculating solution in such relation and amount with respect to the temperature and amount, respectively, of the gas treated, as to effect a cooling of the gas from a high temperature ranging from substantially 56° C. to 48° C. down to a low temperature ranging from 21° C. to 31° C., and maintaining a sufficient content of actified sodium carbonate in the solution to effect a removal from the gas of the bulk of its contained hydrogen sulphide.

3. The process of treating fuel gas containing hydrogen sulphide which comprises removing tar therefrom, then passing the gas through an acid bath to remove ammonia from the gas, and thereafter recirculating an aqueous solution of sodium carbonate through a cycle comprising an absorption stage in which it is brought into contact with the flowing gas while still hot from the acid bath and an actification stage, maintaining the temperature and volume of the recirculating solution in such relation and amount with respect to the temperature and amount, respectively, of the gas treated, as to effect a cooling of the gas from a high temperature ranging from substantially 56° C. to 48° C. down to a low temperature ranging from 21° C. to 31° C., maintaining a sufficient content of actified sodium carbonate in the solution to effect a removal from the gas of the bulk of its contained hydrogen sulphide, and replacing all withdrawals of spent solution with substantially equal amounts of fresh sodium carbonate solution.

4. In the process of purifying fuel gas from hydrogen sulphide which comprises, removing tar therefrom, then passing the gas through an acid bath to remove ammonia from the gas, and thereafter recirculating an alkaline absorbent solution through a cycle comprising an absorption stage in which it is brought into contact with the flowing gas and an actification stage in which it is aerated, the improvement which comprises locating said absorption stage at a point where the gas is at a temperature materially above atmospheric from the reaction of the acid bath treatment and supplying sufficient air to said actification stage to cause the solution to effect a cooling of the gas down to substantially atmospheric temperature, a removal from the solution of an amount of hydrogen sulphide corresponding to the bulk of the hydrogen sulphide contained in said gas and an amount of moisture equal to that removed from the gas in the cooling effected in said absorption stage.

5. The process of treating coal gas prior to distribution thereof, which comprises cooling the gas to remove tar and ammonia therefrom and to condition the gas for removal of the remaining tar, then effecting said removal of tar, then reheating the gas to a temperature suitable for the removal of the remaining ammonia therefrom with sulphuric acid and treating the gas with sulphuric acid to effect said removal of ammonia, and finally accomplishing simultaneous purification of the gas from hydrogen sulphide and analogous acidic impurities and cooling of the gas, by washing the warm gas with a solution containing sodium carbonate recirculated through a cycle comprising said washing stage and an actification stage in which the solution is subjected to aeration, said aeration being conducted to a sufficient extent to remove from the solution an amount of impurities substantially equal to the bulk of the impurities contained in the gas treated and an amount of moisture substantially equal to the amount of moisture given up by the gas in cooling from the elevated temperature at which it leaves the acid treatment stage to substantially atmospheric temperature, whereby the gas is purified from the bulk of its acidic impurities to undue dilution of the recirculated liquid avoided.

6. The process of treating coal gas prior to distribution thereof, which comprises cooling the gas to remove tar and ammonia therefrom and to condition the gas for removal of the remaining tar, then effecting said removal of tar, then reheating the gas to a temperature suitable for the removal of the remaining ammonia therefrom with sulphuric acid and treating the gas with sulphuric acid to effect said removal of ammonia, and finally accomplishing simultaneous purification of the gas from hydrogen sulphide and analogous acidic impurities and cooling of the gas, by washing the warm gas with a solution containing sodium carbonate recirculated through a cycle comprising said washing stage and an actification stage in which the solution is subjected to aeration, the amount and temperature of air used in said aeration stage being regulated to remove from the solution an amount of impurities substantially equal to the bulk of the impurities contained in the gas treated and an amount of heat substantially equal to the amount of heat given up by the gas in cooling from the elevated temperature at which it leaves the acid treatment stage to substantially atmospheric temperature, whereby the gas is purified from the bulk of its acidic impurities and cooled to substantially atmospheric temperature for distribution.

7. The process of treating coal gas prior to distribution thereof, which comprises cooling the gas to substantially atmospheric temperature to remove tar and ammonia therefrom and to condition the gas for removal of the remaining tar, then effecting said removal of tar, then reheating the gas to a temperature suitable for the removal of the remaining ammonia therefrom with sulphuric acid and treating the gas with sulphuric acid to effect said removal of ammonia, and finally accomplishing simultaneous purification of the gas from hydrogen sulphide and analogous acidic impurities and cooling of the gas, by washing the warm gas with a solution containing sodium carbonate recirculated through a cycle comprising said washing stage and an actification stage in which the solution is subjected to aeration, said aeration being conducted to a sufficient extent to remove from the solution an amount of impurities substantially equal to the bulk of the impurities contained in the gas treated and an amount of heat and moisture substantially equal to the amount of heat given up by the gas in cooling from the elevated temperature at which it leaves the acid treatment stage to substantially atmospheric temperature slightly in excess of the temperature to which the gas is cooled in the primary cooling stage, whereby the gas is purified from the bulk of its acidic impurities and cooled to substantially atmospheric temperature for distribution and undue dilution of the recirculated liquid avoided.

8. The process of treating coal gas prior to distribution thereof, which comprises cooling the gas to remove tar and ammonia therefrom and to condition the gas for removal of the remaining tar, then effecting said removal of tar, then reheating the gas to a temperature suitable for the removal of the remaining ammonia therefrom with sulphuric acid and treating the gas with sulphuric acid to effect said removal of ammonia, and finally accomplishing simultaneous purification of the gas from hydrogen sulphide and analogous acidic impurities and cooling of the gas, by washing the warm gas with a solution containing sodium carbonate recirculated through a cycle comprising said washing stage and an actification stage in which the solution is subjected to aeration, said aeration being conducted to a sufficient extent to remove from the solution an amount of impurities substantially equal to the bulk of the impurities contained in the gas treated and an amount of heat substantially equal to the amount of heat given up by the gas in cooling from the elevated temperature at which it leaves the acid treatment stage to substantially atmospheric temperature, whereby the gas is purified from the bulk of its acidic impurities and cooled to substantially atmospheric temperature for distribution, removing the air employed from said actification stage and conducting it over a bed of incandescent fuel for the oxidation of the hydrogen sulphide contained in said air.

9. The process of treating coal gas prior to distribution thereof, which comprises cooling the gas to remove tar and ammonia therefrom and to condition the gas for removal of the remaining tar, then effecting said removal of tar, then reheating the gas to a temperature suitable for the removal of the remaining ammonia therefrom with sulphuric acid and treating the gas with sulphuric acid to effect said removal of ammonia, and finally accomplishing simultaneous purification of the gas from hydrogen sulphide and analogous acidic impurities and cooling of the gas, by washing the warm gas with a solution containing sodium carbonate recirculated through a cycle comprising said washing stage and an actification stage in which the solution is subjected to aeration, said aeration being conducted to a sufficient extent to remove from the solution an amount of impurities substantially equal to the bulk of the impurities contained in the gas treated and an amount of heat substantially equal to the amount of heat given up by the gas in cooling from the elevated temperature at which it leaves the acid treatment stage to substantially atmospheric temperature, whereby the gas is purified from the bulk of its acidic impurities and cooled to substantially atmospheric temperature for distribution, removing the air employed from said actification stage and passing it through the incandescent fuel bed of a gas producer for the oxidation of the hydrogen sulphide contained in said air.

FREDERICK W. SPERR, Jr.